United States Patent [19]

Hassenfelt, Jr.

[11] Patent Number: 4,648,300

[45] Date of Patent: Mar. 10, 1987

[54] BISCUIT CUTTING APPARATUS

[76] Inventor: Harold E. Hassenfelt, Jr., 565 E. Indiana Ave., Southern Pines, N.C. 28387

[21] Appl. No.: 741,906

[22] Filed: Jun. 6, 1985

[51] Int. Cl.⁴ .............................................. B26D 1/02
[52] U.S. Cl. ...................................... 83/762; 30/114; 30/312
[58] Field of Search ................. 30/289, 114, 312, 313; 83/761, 762

[56] References Cited

U.S. PATENT DOCUMENTS

| | | | |
|---|---|---|---|
| 179,934 | 7/1876 | Merwin | 83/762 |
| 1,462,717 | 7/1923 | Maus | 30/114 |

FOREIGN PATENT DOCUMENTS 866239  2/1953  Fed. Rep. of Germany ........ 30/312

Primary Examiner—Douglas D. Watts
Attorney, Agent, or Firm—Charles R. Rhodes; Judith E. Garmon

[57] ABSTRACT

A square frame surrounds and extends upwardly from a planar cutting surface to define a dough compartment. A plurality of vertical slots in each side wall extend from the top edge thereof down to the cutting surface to provide a guide for a cutting blade inserted therein. The slots are arranged in such a pattern that three, four, or six equal width slices may be formed in each direction depending on the slots selected for use. The cutter blade is accurately shaped along the bottom from end to end to ensure good contact with the cutting surface. An enlarged end portion at each end of the cutting blade prevents inadvertent dislodgement of the cutting blade during usage. A flour trough is provided on one side wall to facilitate the maintenance of a floured cutting blade during usage.

12 Claims, 5 Drawing Figures

BISCUIT CUTTING APPARATUS

BACKGROUND AND SUMMARY OF THE PRESENT INVENTION

This invention relates to biscuit cutting apparatuses, and more specifically to an apparatus for cutting biscuits that eliminates the re-rolling and waste of dough.

As most cooks and housewives are aware, the making of biscuits conventionally comprises the steps of: (1) preparation of the dough; (2) rolling of the dough into a flat mass of a prescribed height; (3) cutting circular dough biscuits from the mass; (4) collecting the excess dough, reshaping it into a ball, and re-rolling it into another flat mass of the same prescribed height from which additional biscuits are cut; and (5) repeating step number (4) until all the dough is used. This operation is rather time-consuming and requires some skill and experience in rolling the dough so that it does not stick to the roller or the cutting surface, and cutting the dough biscuits in such a manner as to maximize the dough usage with each roll. Even so, re-rolling of the dough results in a biscuit of inferior quality, because the warmth of the hand as the dough is gathered and rolled again makes the final product tougher, and the addition of excess flour required to re-roll the dough makes the resulting biscuit drier. Thus, the present inventor has recognized that superior biscuits may be more easily made if the re-rolling step can be eliminated. The inventor of the present invention has further determined that the re-roll can be eliminated, if the consumer is willing to accept square or rectangular biscuits. It is not believed that this is a barrier that cannot be overcome.

There have been attempts in the prior art to produce dough cutting apparatuses or techniques. For example, one early approach to slicing bread utilizes a wooden box with a plurality of equally spaced slots in the side walls through which a string was inserted to slice bread dough within the box into slices. Also, an early attempt to slice biscuit dough involved a rectangular dough forming pan utilized in conjunction with a pizza cutter to cut the dough apart and bake it in the same pan. The results were unsatisfactory, because bisquits need to be separated.

The inventor has had in use in recent years a commercial unit including a rectangular frame with a plurality of equally spaced slots and a simple straight blade. The straight cutting blade is inserted between corresponding guide slots in opposite walls to initially cut the biscuits.

All of these approaches, while having some merit, fall somewhat short of the mark in providing a biscuit cutting apparatus satisfactory for domestic or home usage by the housewife or home cook. For example, the domestic cook may wish to vary the size of the biscuits from time to time, depending upon the occasion for which the biscuits are being made. The cutting surface of the aforesaid approaches may become bowed or warped, with the result that a straight edge cutter blade will not satisfactorily cut the biscuit dough. The cutter may be inadvertently drawn completely through the slots in the side walls during the cutting operation, thereby resulting in unacceptable cuts or wasted time. Further, the earlier apparatus does not include a flour trough for enabling the housewife or domestic cook to easily maintain flour on the cutting blade.

It is against this type of background that the present invention was developed. The present invention is directed to an apparatus for assisting in the rolling and cutting of biscuit dough, which apparatus is specifically designed for home or domestic usage by the housewife or domestic cook. It is simple and easy to use, ensures a good cut of the biscuit dough, and allows the domestic cook the flexibility of selecting whether she/he wants to produce large, medium, or small size biscuits.

In general, the present invention is directed to a dough compartment formed by planar cutting surface surrounded by a rectangular frame having a plurality of side walls. The height of the side walls is substantially equal to the thickness of biscuit dough to be formed therein. Each of the side walls include a pattern of vertical slots extending from the top thereof down to the planar cutting surface. A separate cutting blade having a length greater than the distance between opposed side walls and a thickness less than the width of the aforementioned slots is inserted in corresponding slots in opposed walls and manipulated back and forth to make a slice through the biscuit dough. After the cutting blade has been introduced into all of the selected slots for a prescribed size of biscuits, the biscuits are then separated and ready for placement on a biscuit sheet for baking.

The slots are arranged in such a pattern that different sets of equal width slices may be made between each pair of opposed side walls. Thus, large biscuits may be formed, medium sized biscuits may be formed, or small party size biscuits may be formed merely by utilizing the same cutting blade in conjunction with different slot groupings.

The cutting blade itself is uniquely designed in order to facilitate the cutting operation and ensure against defective cuts. Toward this end, the operative edge of the cutting blade is formed with an arcuate or bowed configuration along the length thereof, so that by rocking the blade, the entire cutting surface will be engaged through the biscuit dough and a good clean cut will be made. Further, the blade includes an enlarged portion or bead at each end thereof, which enlarged portion is of greater width than the corresponding slots in the side wall, whereby during the actual slicing operation the blade cannot be inadvertently pulled through the side wall resulting in an improper slice.

Finally, in an alternate embodiment a flour trough may be formed integrally with or affixed to one side wall of the cutting frame. The flour trough extends outwardly from the side wall and is of a length greater than that of the cutting blade. During use, the cutting blade may be periodically dipped in the trough containing flour to maintain a good floured cutting blade.

It is therefore an object of the present invention to provide a biscuit cutting apparatus specifically designed for domestic use.

Another object of the present invention is to provide a biscuit cutting apparatus of the type described, which eliminates the necessity for re-rolling of the dough.

Yet another object of the present invention is to provide a biscuit cutting apparatus of the type described in which a user can selectively form large, medium, or small biscuits of equal size with a single rolling.

Other objects and a fuller understanding of the invention will become apparent from reading the following detailed description of a preferred embodiment along with the accompanying drawings in which.

DETAILED DESCRIPTION OF A PREFERRED EMBODIMENT

Figure 1:
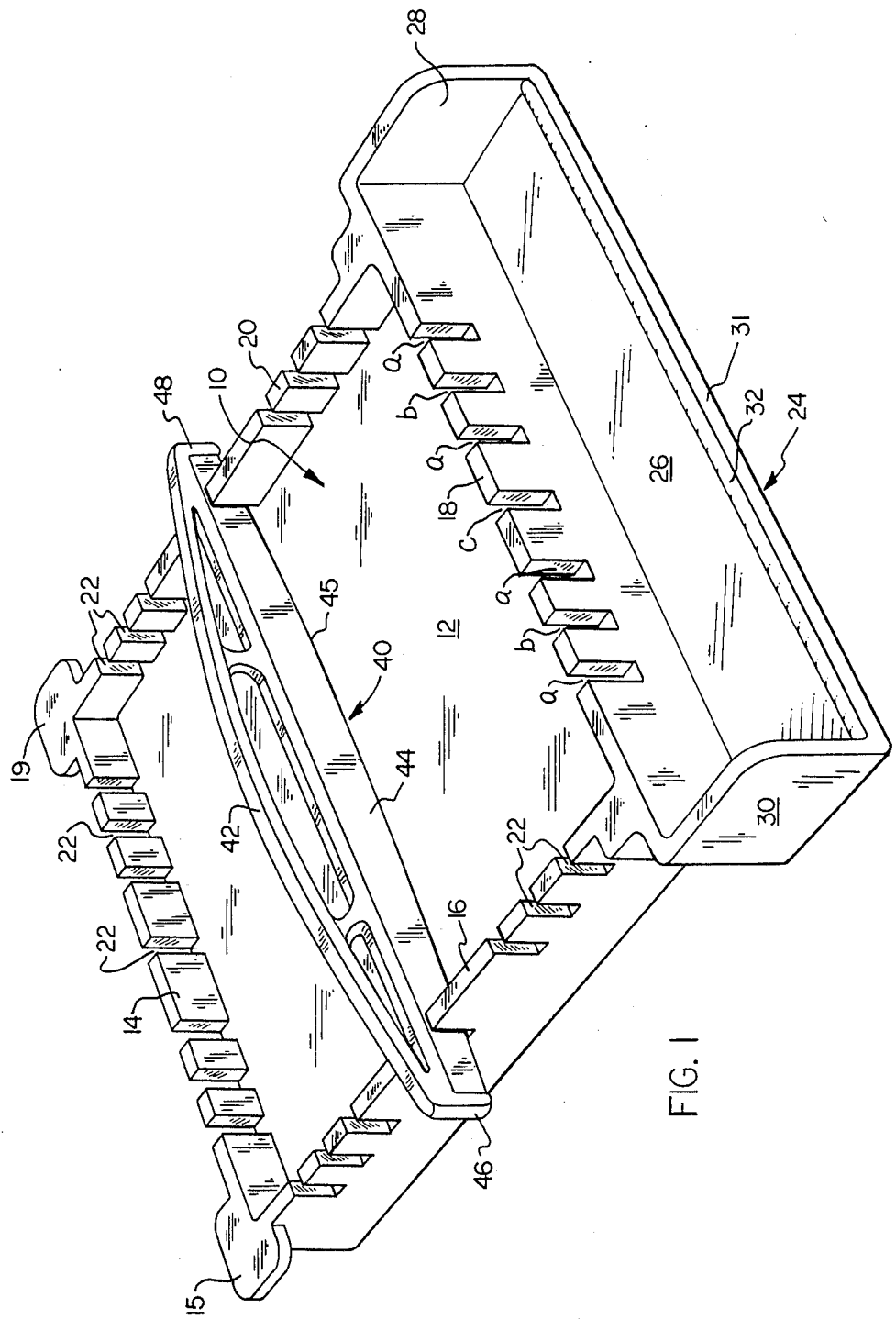
FIG. 1 is a perspective view illustrating a preferred embodiment of the invention.

Turning now to the drawings, there is illustrated in FIG. 1 the apparatus of the present invention which comprises, in general, a dough compartment 10 and a reciprocal cutting blade 40. Dough compartment 10 includes a planar cutting surface 12 surrounded by a rectangular frame composed of side walls 14,16,18, and 20. The planar cutting surface 12 and rectangular frame formed of walls 14,16,18 and 20 are preferably integrally formed, however, may be formed so as to be separable in any conventional way.

Corner tabs 15,19 are provided at the intersection of corners 14,16 and 14,20 respectively, to provide a means for the operator to grip the apparatus 10 during usage thereof. Looking at FIG. 2, it is apparent that side walls 14–20 preferably extend downwardly below the level of planar cutting surface 12. A pair of criss-crossed ribs 21,23 extend from corner to corner of the frame for reinforcement of the cutting surface 12.

A plurality of guide slots 22 are formed in side walls 14,16,18 and 20 for receiving the cutting blade 40 therein during operation. Slots 22 extend from the upper edge of the side walls 14–20 completely down to the planar cutting surface 12, so that the cutting blade 40 may be inserted into corresponding slots 22 of opposed side walls and cut entirely through the biscuit dough down to the cutting surface 12.

Slots 22 are arranged in each side walls in accordance with a predetermined pattern. Looking at side wall 18, it is first seen that there is a central slot c therein. Each half of the side wall 18 is then divided by two slots which divide the half of the side wall into thirds and single slot b which splits each half of the distance between central slot c and the end of side wall 18 in half. Thus formed, if an operator wants to form six equal slices in each direction, she/he inserts the cutting blade 40 in each slot a and central slot c. If the operator wants to form four equal width slices in each direction, she/he introduces the cutting blade 40 in each slot b and the center slot c. Similarly, if the operator wants to form three equal width slices in each direction, she/he introduces the cutting blade 40 into the two more centrally located slots a. In the illustrated embodiments, the cutting frame is square, however, it is obvious that rectangular cutting frames would also suffice, as long as the cutting blade 40 were longer than the longest dimension.

Figure 2:
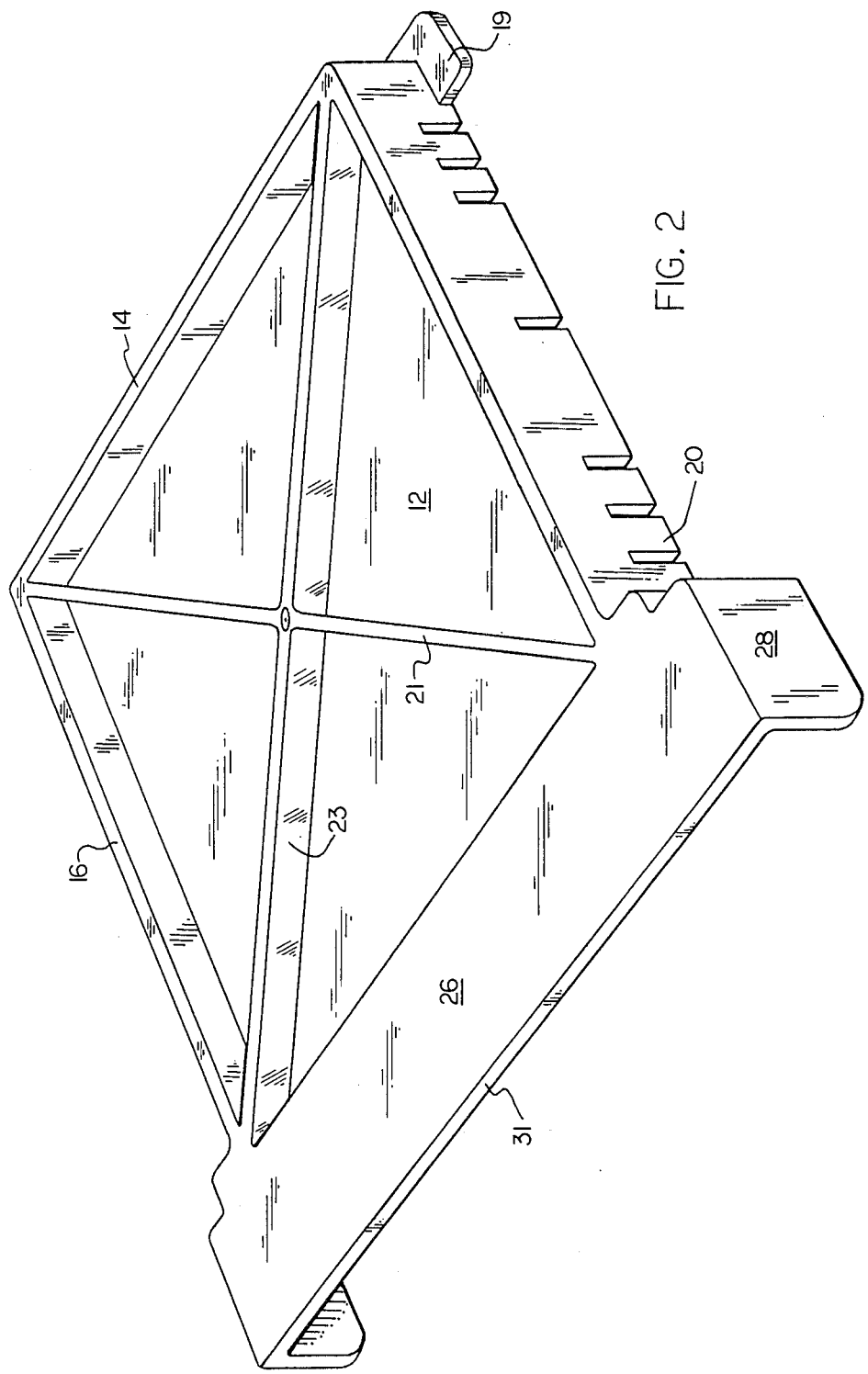
FIG. 2 is a perspective view similar to FIG. 1, except showing the underneath side of the biscuit cutting frame.

In the preferred embodiment illustrated in FIGS. 1 and 2, a flour trough 24 is molded integrally adjacent side wall 18. Trough 24 includes a lower or bottom wall 26, two end walls 28 and a front wall 31. The height dimension of front wall 31 is relatively small terminating in an upper lip 32 therealong. The height of wall 31 determines the depth of flour which may be contained within the trough. The trough is utilized by dipping the cutting blade 40 thereinto periodically to maintain a floured surface on the cutting edge 45.

Figures 3, 4:
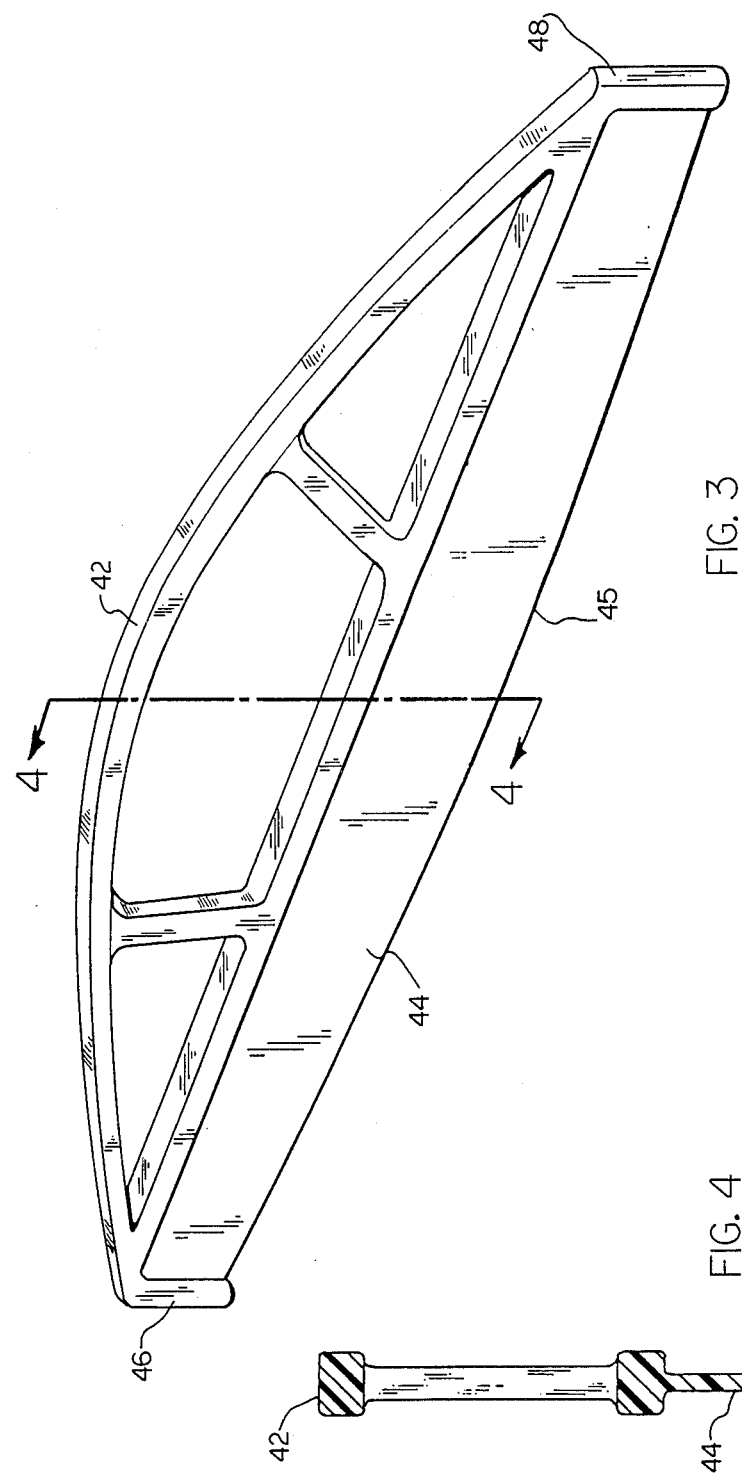
FIG. 3 is a perspective view illustrating the cutting blade removed from the cutting frame.
FIG. 4 is a sectional view taken substantially along lines 4—4 in FIG. 3.
Figure 5:
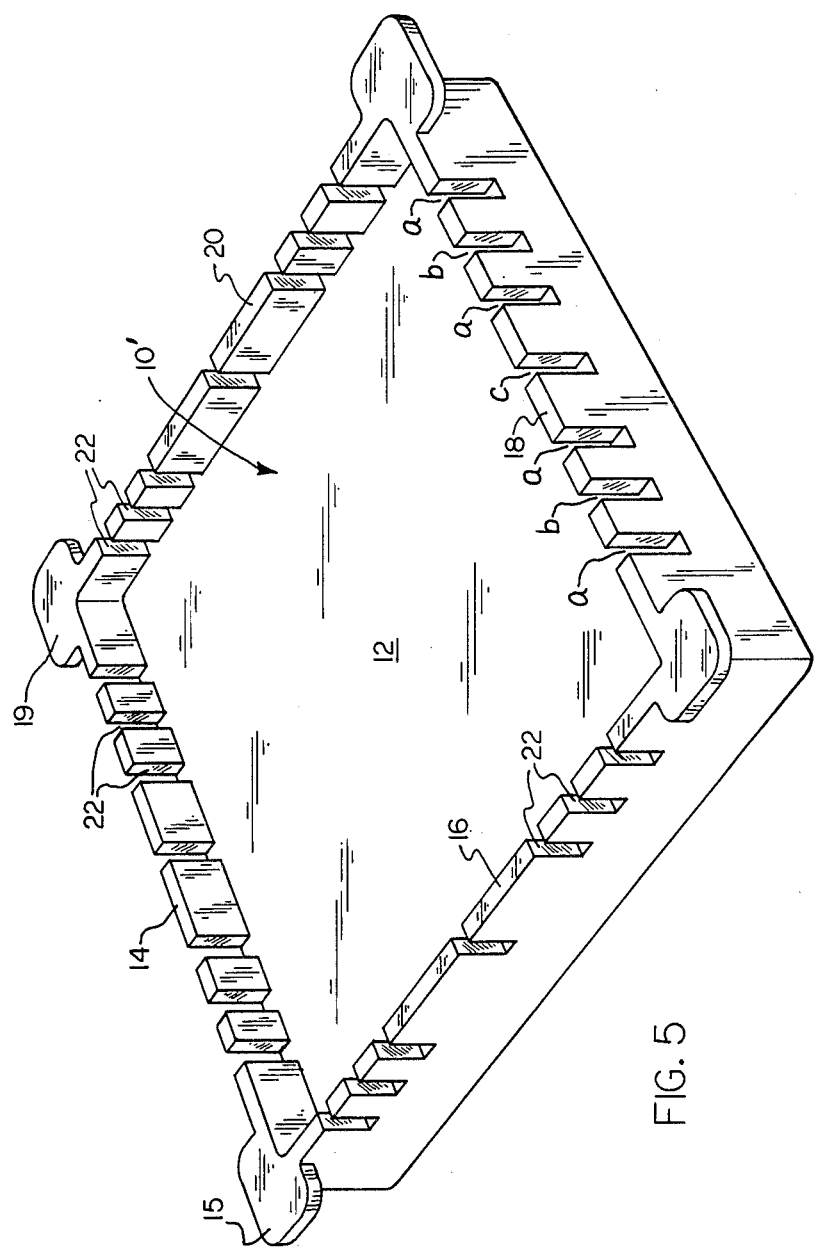
FIG. 5 is a perspective view illustrating an alternate embodiment of the present invention in which the flour trough along one side is removed.

Turning now to FIG. 3, there is illustrated the cutting blade 40 removed from the cutting frame. An arcuate handle portion 42 includes the operative portion of the blade 44 depending therefrom. The lower edge 45 of cutting blade 44 is curved or arcuate along its length, so that by a rocking motion, the operator can ensure that the dough is severed completely along the cutting surface 12, regardless of whether the cutting surface has become warped or bowed after repeated usage and washings. The ends of the cutting blade 44 include enlarged projections or beads 46,48 which prevent the blade 42 from being pulled completely through the slots in which it is inserted during the operation thereof. Obviously, the blade 44 should be somewhat longer than the distance between opposed side walls, so that the cutting blade 40 may be reciprocated during usage.

FIG. 4 is illustrative of an alternate embodiment of the cutting apparatus, which is very similar to the embodiment shown in FIGS. 1 and 2, with the exception that the flour trough 24 has been removed.

Operation of the cutting apparatus is as follows. With the cutting blade removed, the dough compartment 10 is completely filled with dough and leveled, so that the dough is of a height corresponding to the height of walls 14,16,18 and 20. The operator then selects the number of biscuits which she/he wants to cut from the dough in dough compartment 10. She/he then introduces the cutting blade 40 into the appropriate slots 22 to cut the dough into the designated number of squares. The squares are then removed from the dough compartment 10, placed on a conventional baking sheet and baked as the appropriate recipe prescribes.

While preferred embodiments of the invention have been described in detail hereinabove, it is apparent that various changes and modifications might be made without departing from the scope of the invention which is set forth in the accompanying claims.

What is claimed is:

1. Apparatus for rolling and cutting biscuit dough comprising:
   (a) a planar cutting surface;
   (b) a rectangular frame surrounding said cutting surface and forming a dough compartment, said frame including a plurality of side walls of a height substantially equal to the thickness of biscuit dough to be formed;
   (c) each of said side walls including a plurality of vertical slots of a prescribed width therein extending from the top of said walls down to said planar cutting surface;
   (d) a separate cutting blade having a length greater than the distance between opposed side walls and a thickness less than the width of said slots, whereby the blade may be inserted in corresponding slots in opposed walls and manipulated back and forth to sever the biscuit dough thereunder;
   (e) said plurality of slots being so arranged in such a prescribed pattern that a plurality of different sets of equal width cuts may be made along each side wall; and
   (f) a flour trough extending outwardly from one of said side walls, said flour trough being of a length greater than the corresponding length of said cutting blade.

2. The apparatus according to claim 1 wherein said frame is square and said pattern of slots is arranged to selectively form sets of three, four, or six equal slices in each direction.

3. The apparatus according to claim 1 wherein said cutting blade includes an enlarged portion adjacent each end, the width of said enlarged portion being greater than the corresponding width of said slots, so that said blade will not pull completely through said slots during usage.

4. The apparatus according to claim 1 wherein the lower edge of said cutting blade defines a curved or arcuate path from end to end, whereby a slight rocking motion imparted during the slicing operation ensures engagement of the entire cutting surface by the cutting blade.

5. Apparatus for rolling and cutting biscuit dough comprising:
   (a) a planar cutting surface;
   (b) a rectangular frame surrounding said cutting surface and forming a dough compartment, said frame including a plurality of side walls of a height substantially equal to the thickness of biscuit dough to be formed;
   (c) each of said side walls including a plurality of vertical slots of a prescribed width therein extending from the top of said walls down to said planar cutting surface;
   (d) a separate cutting blade having a length greater than the distance between opposed side walls and a thickness less than the width of said slots, whereby the blade may be inserted in corresponding slots in opposed walls and manipulated back and forth to sever the biscuit dough thereunder;
   (e) said cutting blade includes an enlarged portion at each end, the width of said enlarged portion being greater than the width of said slots, so that said blade will not pull completely through said slots during usage; and
   (f) a flour trough extending outwardly from one of said side walls, said flour trough being of a length greater than the corresponding length of said cutting blade.

6. The apparatus according to claim 5 wherein said plurality of slots are arranged in such a prescribed pattern that a plurality of different sets of equal width cuts may be made in each direction.

7. The apparatus according to claim 6 wherein said frame is square and said pattern of slots is arranged to selectively form sets of three, four, or six equal slices in each direction.

8. The apparatus according to claim 5 wherein the lower edge of said cutting blade defines a curved or arcuate path from end to end, whereby a slight rocking motion imparted during the slicing operation ensures engagement of the entire cutting surface by the cutting blade.

9. Apparatus for rolling and cutting biscuit dough comprising:
   (a) a planar cutting surface;
   (b) a rectangular frame surrounding said cutting surface and forming a dough compartment, said frame including a plurality of side walls of a height substantially equal to the thickness of biscuit dough to be formed;
   (c) each of said side walls including a plurality of vertical slots of the same width therein extending from the top of said walls down to said planar cutting surface;
   (d) a separate cutting blade having a length greater than the distance between opposed side walls and a thickness less than the width of said slots, whereby the blade may be inserted in corresponding slots in opposed walls and manipulated back and forth to sever the biscuit dough thereunder;
   (e) the lower edge of said cutting blade extends in a curved or arcuate path from end to end, whereby a slight rocking motion imparted during the slicing operation ensures engagement of the entire cutting surface and a clean cut through the biscuit dough; and
   (f) a flour trough extending outwardly from one of said side walls, said flour trough being of a length greater than the corresponding length of said cutting blade.

10. The apparatus according to claim 9 wherein said plurality of slots are arranged in such a prescribed pattern that a plurality of different sets of equal width slices may be made in each direction.

11. The apparatus according to claim 10 wherein said frame is square and said pattern of slots is arranged to selectively form sets of three, four, or six equal slices in each direction.

12. The apparatus according to claim 9 wherein said cutting blade includes an enlarged portion at each end, the width of said enlarged portion being greater than the corresponding width of said slots, so that said blade will not pull completely through said slots during use.

* * * * *